United States Patent [19]

Hsieh

[11] Patent Number: 4,926,365

[45] Date of Patent: May 15, 1990

[54] PORTABLE COMPUTER SYSTEM

[75] Inventor: Lai-Fa Hsieh, Taipei, Taiwan

[73] Assignee: Great Electronics Corporation, Taipei, Taiwan

[21] Appl. No.: 236,836

[22] Filed: Aug. 26, 1988

[51] Int. Cl.⁵ .............................................. G06F 1/00
[52] U.S. Cl. .................................................... 364/708
[58] Field of Search ............... 364/708; 361/394, 391, 361/413, 380

[56] References Cited

U.S. PATENT DOCUMENTS

| | | | |
|---|---|---|---|
| 4,497,036 | 1/1985 | Dunn | 364/708 |
| 4,742,478 | 5/1988 | Nigro, Jr. et al. | 364/708 |
| 4,769,764 | 9/1988 | Revanon | 364/708 |

FOREIGN PATENT DOCUMENTS

| | | | |
|---|---|---|---|
| 60-160418 | 8/1985 | Japan | 364/708 |
| 0617971 | 1/1986 | Japan | 364/708 |

OTHER PUBLICATIONS

*IBM Technical Disclosure Bulletin,* "Removable Liquid Crystal Display for a Personal Computer", vol. 29, #10, pp. 4273–4274, Mar. 1987.

*Primary Examiner*—Gary V. Harkcom
*Assistant Examiner*—Dale M. Shaw
*Attorney, Agent, or Firm*—Morton J. Rosenberg; David I. Klein

[57] ABSTRACT

A portable computer system (1) including a central processing unit contained within a main housing and includes a keyboard (15), display screen (12), floppy disk driver (9) and a hard disk driver (10). A forked crevice fixed pin base (3) couples cover (11) to the main housing of portable computer system (1) by releasable securement of a screen connector plate (16) and a computer connector insert member (2). A locking mechanism (13) is provided on the cover for interface with the main housing of the portable computer system (1) to provide a compact overall closed system having a handle (5) which allows portability by a user. A battery box (4) is insertable and removable from the main housing of the portable computer system (1). A replaceable hard disk drive (10) is insertable with a recess formed within the main housing of portable computer system (1) to allow insert and removability therefrom. A number of expansion systems such as a RAM board (8), a modem (7), and circuit boards (6) are provided for insert and removability from portable computer system (1).

4 Claims, 7 Drawing Sheets

//4,926,365//

PORTABLE COMPUTER SYSTEM

BACKGROUND OF THE INVENTION

FIELD OF THE INVENTION

The subject invention is directed to a portable computer system. In particular, the subject invention relates to a portable computer system which is characterized in that the screen of the personal computer system is arranged for ease of removal and insertion into the main housing of the portable computer system. Still further, this invention directs itself to a portable computer system having a battery box which is detachably mounted to supply internal power and maintain the personal computer system of the subject invention independent of an external power source. Still further, this invention directs itself to a portable computer system including both floppy and hard disk drivers for differing applications. Additionally, this invention directs itself to a portable computer system which includes a central processing unit enclosed within a main housing having a cover with a display screen forming an inner side of the cover. More in particular, this invention directs itself to a portable computer system wherein a cover having a display screen formed on an inner side thereof is displaceable with respect to the main housing to both a closed position and an open position providing a closed contour portable computer system overall housing for hand carrying and ease of application.

Still further, the subject portable computer system provides for at least two different LCD screens for alternative application by the user in daylight or at night.

Further, the subject portable computer system includes a central processing unit which comprises a built-in floppy disk driver and a receptacle for coupling with a hard disk driver for alternative selection by the user.

The subject portable computer system includes a removable and insertable battery box mounted at the rear portion of the main portable computer system to allow the user to operationally actuate the portable computer system wholly through an internal power source.

Further, the entire portable computer system of the subject invention is contoured in a configuration of a flat case with the inner side of the cover being a display screen. When the cover is closed, the portable computer system is transformed into a flat case with a handle which allows it to be hand carried by the user.

The portable computer system of the subject invention is provided with the aforementioned battery box which is mounted in the main housing of the portable computer system by a pair of sliding block members to retain the battery box within slots formed in the main housing to prevent the battery box from being removably displaced. Further, a plurality of expansion contact points are provided for interfacing with the floppy disk driver, a printer, a modem, a video screen, and an expansion board and allows compatibility with an IBM PC/AT system. Further, the portable computer system includes a built-in spacing for mounting of RAM to expand memory capacity upward to 1.6 Mbytes. Still further, a mini-screen system is provided on the keyboard of the portable computer system to allow the user to visually note the operating condition and operating mode of the portable computer system at any time during operation.

PRIOR ART

In some prior art personal computers, the display screen and the keyboard are attached to the main operating machine system. In some prior art computer systems, the display screens are composed of a cathode ray tube which has a large volume and is heavy. Further, other prior art systems include central processing units, keyboards and screens which are separately located in three independent portions of the overall operating machine. Keyboards and central processing units of such systems are coupled by means of bus lines and display screens and main machine areas are coupled by means of cable. In such systems, the whole assembly has an extended volume and requires a large space for allocation of all of the lines. In many prior art systems, power lines are required and are coupled to external power sources. Thus, such computer systems are confined to the vicinity of an external electrical receptacle and such systems may not be pre-removed and are not portable, as is the subject invention concept portable computer system.

SUMMARY OF THE INVENTION

A portable computer system having a central processing unit enclosed within a main housing. The portable computer system includes a keyboard, a display screen, a hard disk drive, a floppy disk drive, and a battery box. The portable computer system includes a cover having the display screen formed on an inner side of the cover. The cover is displaceable with respect to the main housing to a closed position and an open position. A computer connector insert member is secured to the main housing. A screen connector plate member for insert into and out of the computer connector insert member is provided. A forked crevice fixed pin base member is insertable within aligned openings formed in the screen connector plate member and the computer connector insert member. The battery box is attached to the main housing by means of a pair of sliding block members and a pair of substantially L-shaped key block members which are slidingly insertable and retractable into and out of the main housing. Portable computer system has a handle member formed on an outer surface of the cover for portability.

DESCRIPTION OF THE PREFERRED EMBODIMENTS

Figure 1:
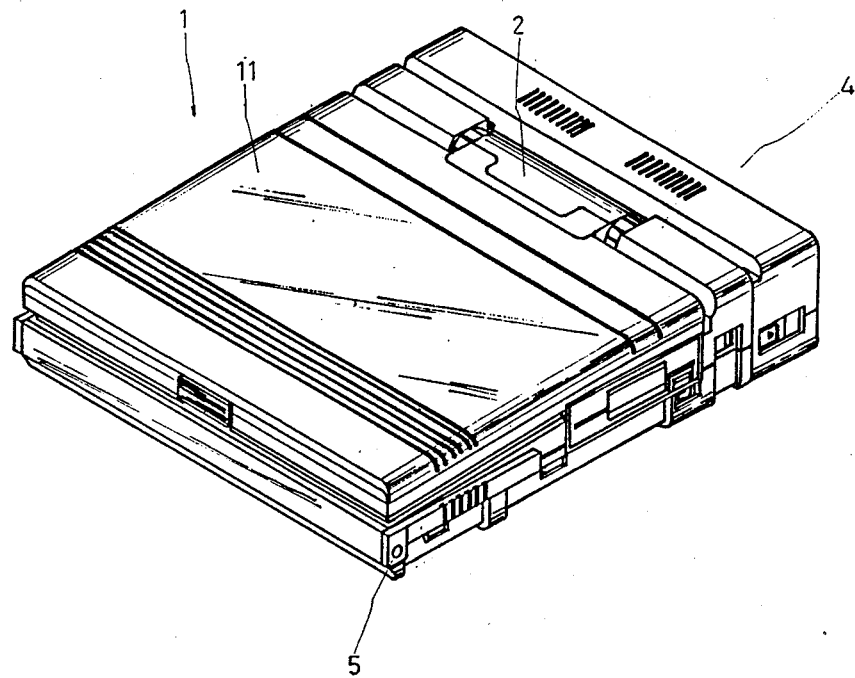
FIG. 1 is a perspective view of the portable computer system of the subject invention in a closed condition.
Figure 2:
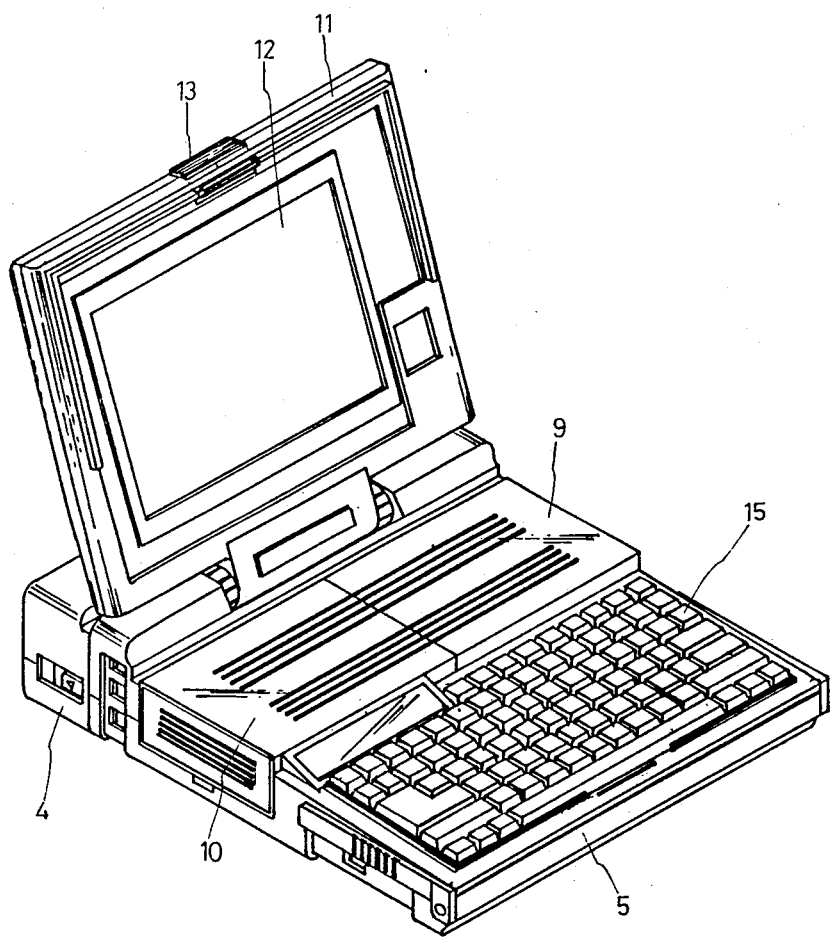
FIG. 2 is a perspective view of the portable computer system of the subject invention showing the display screen and cover member in an open position.
Figure 3:
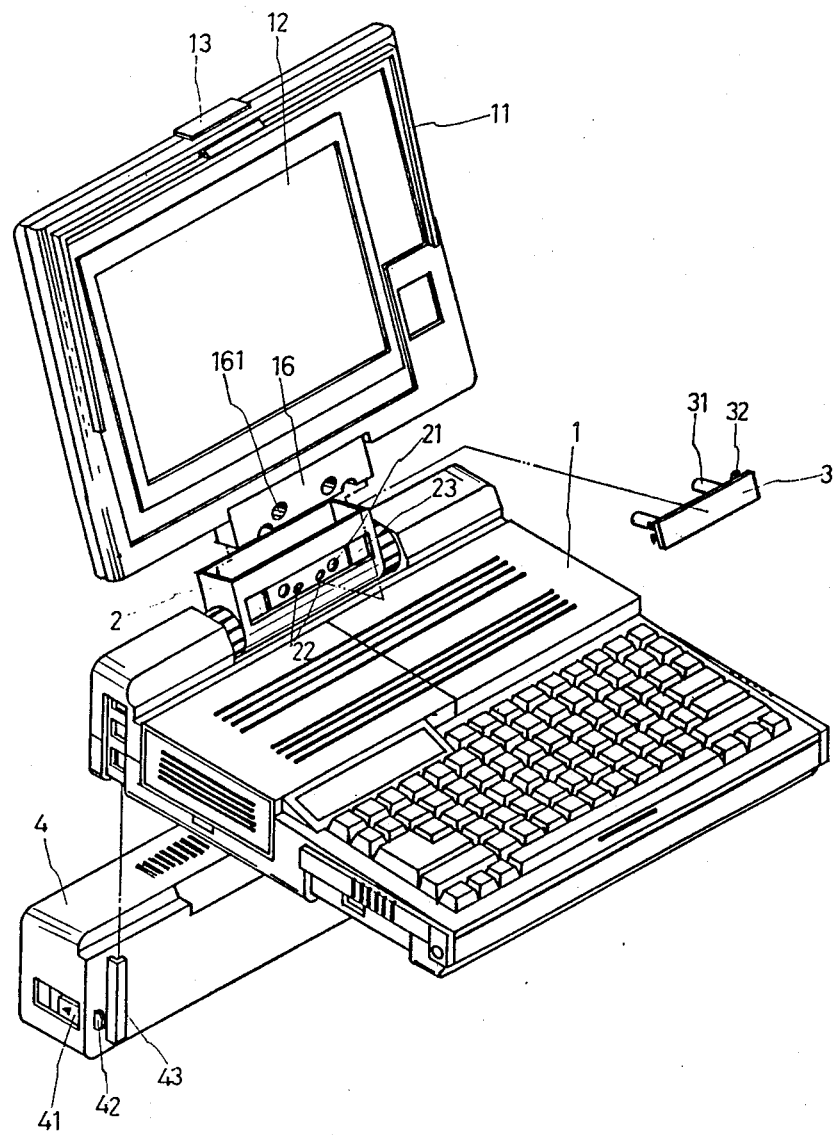
FIG. 3 is a perspective exploded view of the portable computer system.

Referring now to FIGS. 1 and 2, there is shown portable computer system 1 which as shown in FIG. 1 may be closed into a flat case contour and when in an open position as shown in FIG. 2, is substantially the size of a standard lap size computer system. Portable computer system 1 includes a standard central processing unit enclosed within a main housing. Additionally, there is provided keyboard 15 as shown in FIGS. 2 and 3 as well as display screen 12 which may be of the liquid crystal display type. There is further included hard disk driver 10 and floppy disk drive 9, as well as battery box 4 defining a battery housing to be more fully described in following paragraphs.

Portable computer system 1 includes locking mechanism 13 mounted on upper cover 11 which allows for closure of portable computer system 1, as is shown in FIG. 1. Additionally, handle 5 is provided on a frontal portion of the computer housing in order to allow a user to grasp such and provide portability of overall portable computer system 1.

Upper cover 11 includes an inner surface or section which includes LCD screen 12 in a manner that a plurality of screens may be inserted into operational contact with the main housing of portable computer system 1. In this manner where a plurality of LCD screens are provided, one may be formed with a coated fluorescent material and another having a non-fluorescent screen for operation in daylight and night use.

Portable computer system 1 has keyboard 15 of the standard type for interfacing with the portable computer system central processing unit responsive to actuation by the user. Keyboard 15 includes miniscreen 14 shown in FIG. 6 which is used to indicate the current operational mode of portable computer system 1.

Figure 7:
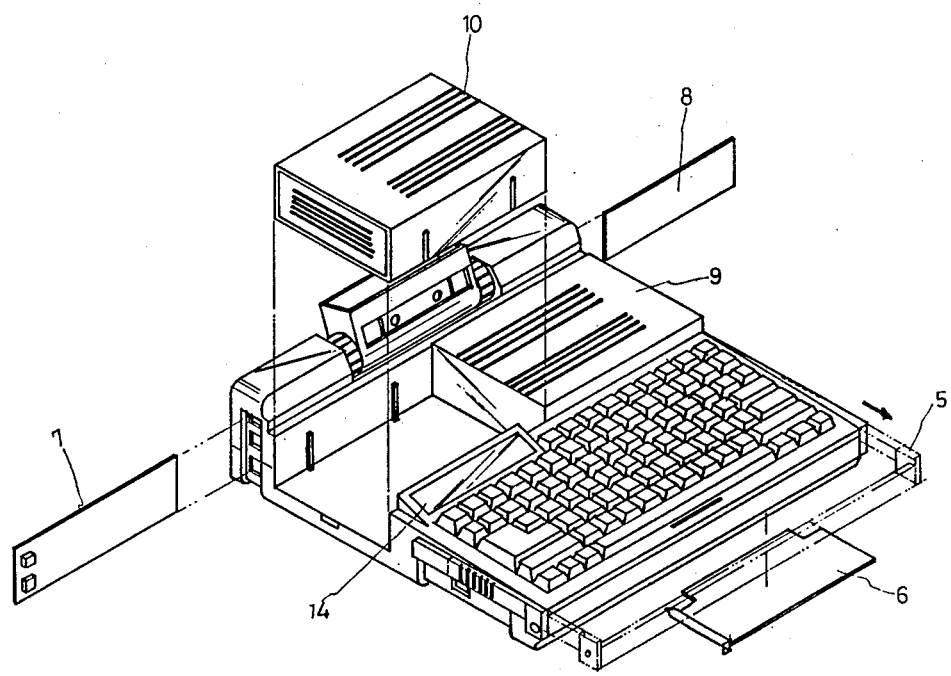

Floppy disk driver 9 shown in FIGS. 2 and 7 is fixedly secured to portable computer system 1 above keyboard 15. Hard disk driver 10 is mounted above keyboard 15 and is coupled to portable computer system 1 by means of a disk driver receptacle on portable computer system 1 (not shown in the Drawings) in a manner such that portable computer system 1 is applicable to disk drivers of differing systems.

Additionally, as shown in FIG. 5, portable computer system 1 is coupled to battery box 4 defining a battery housing. Battery box 4 includes a plurality of DC batteries contained therein and allows for portable computer system 1 to be operationally activated without an external power source.

Figure 4:
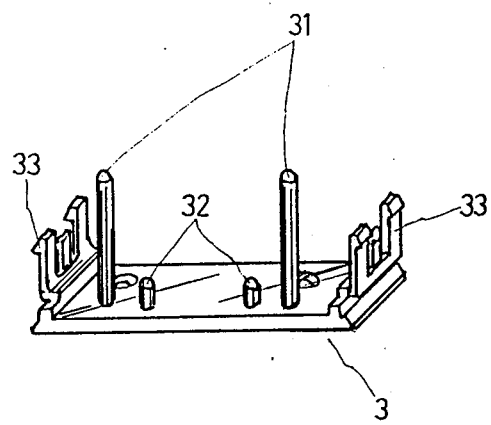
FIG. 4 is a perspective view of the forked crevice fixed pin base member which is utilized for coupling the cover to the main housing of the portable computer system.

Referring now to portable computer system 1, as shown in FIGS. 3 and 4, LCD screen 12 is located at an inner side of upper cover 11 by means of screen connector plate member 16. Screen connector plate member 16 is formed at the bottom of cover member 11 for insert into computer connector insert member 2.

Computer connector insert member 2 includes a pair of locating openings 22 formed in the frontal portion of computer connector insert member 2, as is clearly seen in FIG. 3. Additionally, computer connector insert member 2 includes a pair of displaced housing pin holes 21 which are aligned with screen connector pin holes 161 when upper cover 11 is slid into operational engagement with the main housing of portable computer system 1.

The securement of computer connector insert member 2 to screen connector plate member 16 is provided by forked crevice fixed pin base 3 which is insertable within aligned openings 21 and 161 formed through computer connector insert member 2 and screen connector plate 16, respectively. Computer connector insert member 2 further includes a pair of laterally displaced window openings 23, as is seen in FIG. 3.

Forked crevice fixed pin base 3 includes a pair of key block members 32 for insert into location holes 22. Key block members 32 are clearly seen in FIG. 4, which shows forked crevice fixed pin base 3 in perspective. Additionally, as shown in FIG. 4, base 3 includes a pair of bi-lateral lock plate members 33 which are insertable through window openings 23. Further, pins 31 extend upwardly from the base of forked crevice fixed pin base member 3 and pin members 31 are insertable through aligned pin openings 21 and screen connector pin openings 161 when portable computer system 1 is in an operational configuration.

Bi-lateral lock plate members 33 insertable through respective window openings 23 of computer connector insert member 2 are contoured to respectively hook around the side walls of connector 2. Pins 31 inserted through aligned pin openings 21 and 161 secure cover 11 with the main housing of portable computer system 1. In this manner, display screen 12 may be lifted and detachable from the main housing of portable computer system 1 and provide for a simple replacement insert Referring now to FIGS. 5A-D, there is shown battery box 4 defining a battery housing for containing a plurality of DC batteries to allow actuation and operation of portable computer system 1 without the necessity of an external power source. Battery box 4, as is seen, is in the contour of a parallelipiped and is contoured to interface with the rear portion of the main housing of portable computer system 1, as is clearly seen in FIGS. 1-3.

Figure 5A:
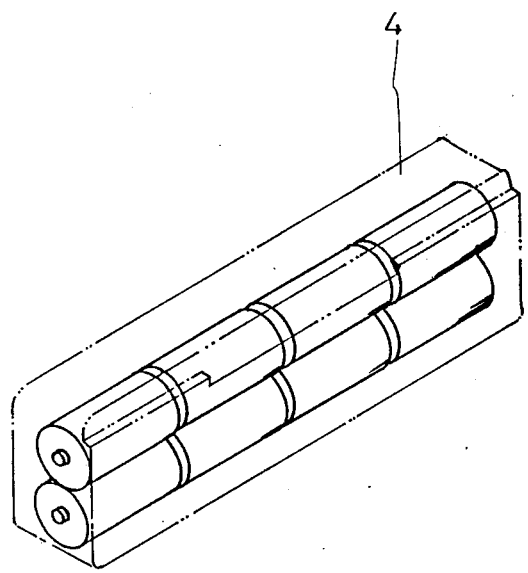
FIG. 5A is a perspective view of the battery box containing a plurality of DC batteries.
Figure 5B:
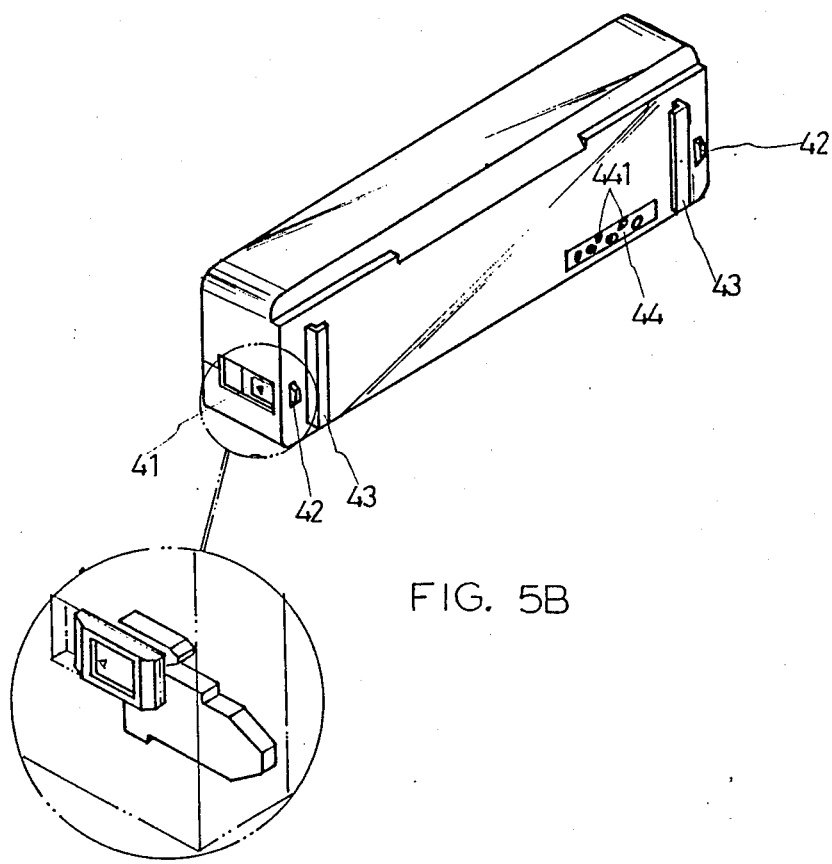
FIG. 5B is a perspective view of the battery box showing a sectional portion of a pair of sliding block members and a pair of L-shaped key block members for coupling the battery box to the main housing of the portable computer system.
Figure 5C:
FIG. 5C is a side view of one type of arrangement of the terminals of the battery box.
Figure 5D:
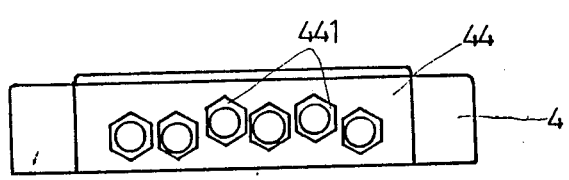
FIG. 5D is a side view of a portion of the battery box showing a pair of protruding ground terminals mounted above a plurality of contact terminals.

Battery box 4 has mounted on an external surface of the battery housing, a pair of L-shaped key block members 43 to be inserted with similarly contoured key block members formed at the rear portion of the main housing of portable system 1 (not shown in the Drawings). In this manner, key block members 43 interface with and releasably capture battery box 4 to the main housing of portable computer system 1 in a linear direction. In order to maintain battery box 4 in an orthogonal captured direction, there is provided a pair of sliding block members 42 operated by respective control switches 41 as is shown in FIG. 5B. Control switch 41 is reversibly movable in a linear direction and responsively displaces a respective sliding block member 42 into and out of the main housing of portable computer system 1 for capturing battery box 4 to the main housing of portable computer system 1. In this manner, when battery box 4 is to be removed from portable computer system 1, control switch 41 is displaced in a rearward direction to responsively displace a respective sliding block member 42 in a direction to allow block member 42 to slide outwardly from a recess within the main housing of portable computer system 1 and thus allowing battery box 4 to be moved in a downward direction and essentially dismantle from the main housing of portable computer system 1.

Battery box 4 further includes a plurality of terminals 44 and further includes a pair of protruding terminals 441 which are grounded terminals. It is clearly seen that grounding terminals 441 are mounted slightly above the remaining terminals 44 of battery box 4. When battery box 4 is slid into electrical contact with the main housing of portable system 1, protruding grounding terminals 441 initially contact with the electrical contact terminals of portable computer system 1 and in this manner, there is prevented the production of instantaneous high voltages and currents to protect portable computer system 1 from electrical overload.

Figure 6:
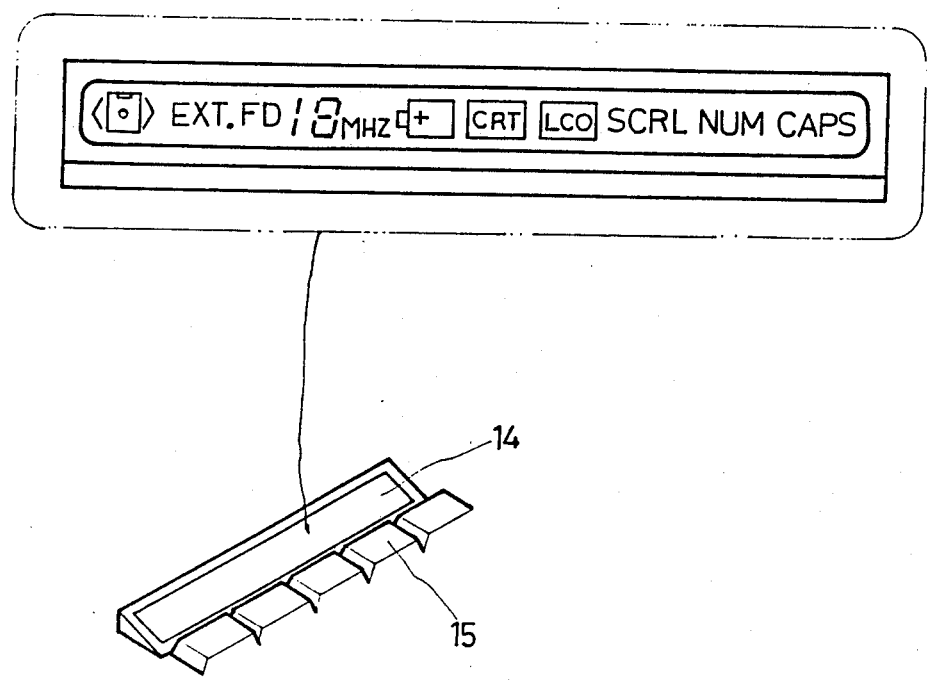
FIG. 6 is a perspective view of a mini-screen display showing operational modes of the overall system; and, FIG. 7 is a perspective, exploded view of the subject portable computer system showing assembly of expansion units insertable and removable from the overall portable computer system.

Referring now to FIGS. 6, 2 and 3, there is shown mini-screen system 14 mounted above keyboard 15 to provide a multiplicity of symbols for indication of the operating modes of portable computer system 1 during an operational phase.

Additionally, portable computer system 1 according to the instant invention concept includes various expansion contact points for external connection with floppy disk drivers, hard disk drivers, printers, modems, circuit board 6 shown in FIG. 7, and includes a built-in chamber for insertion of RAM boards 8 to allow expansion of memory up to 1.6 Mbytes in order to extend the memory capability of portable computer system 1.

Portable system 1 as provided in the subject invention concept provides for a minimization of volume and weight and maximizes versatility for an overall memory expandable system.

What is claimed is:

1. A portable computer system having a central processing unit enclosed within a main housing, a keyboard, a display screen, a hard disk, a floppy disk drive and a battery box wherein the improvement comprises:
    (a) a cover having said display screen forming an inner side of said cover, said cover being displaced with respect to said main housing to a closed position and an open position;
    (b) a computer connector insert member secured to said main housing;
    (c) a screen connector plate member for insert into and out of said computer connector insert member; and,
    (d) a forked crevice fixed pin base member inserted within aligned openings formed in said screen connector plate member and said computer connector insert member, said battery box being attached to said main housing by means of a pair of sliding block members and a pair of substantially L-shaped key block members slidingly inserted and retracted into and out of said main housing, said portable computer system having a handle member formed on an outer surface of said cover for portability, said battery box includes a battery housing containing a plurality of batteries therein, said battery housing including a pair of spaced apart L-shaped key block members formed on a front surface of said battery housing for mating engagement with a pair of respective main housing key block members formed on said main housing at a rear section thereof, said battery housing having a plurality of contact terminals for contiguously interfacing with electrical contacts of said computer system, said contact terminals including at least two protruding contact terminals extending from said battery housing for initially contacting said computer system contact terminals when said battery housing is inserted into electrical contact with said computer system main housing for preventing an initial induction of an instantaneous voltage and current surge, said battery housing further including a pair of sliding block members being displaced by a control switch which responsively displaces a respective sliding block member into and out of said main housing.

2. The portable computer system as recited in claim 1 where said display screen is a LCD member, said LCD member having said screen connector plate member secured to a lower portion thereof, said screen connector plate member having a pair of screen connector pin holes formed therethrough, said computer connector insert member being secured to said main housing at an upper rear section thereof, said computer connector insert member having a pair of housing pin holes aligned with said screen connector pin holes, said computer connector insert member including a pair of opposing window openings and a pair of locating openings formed central of said computer connector insert member, said forked crevice fixed pin base having a pair of lock plate members inserted and retained within said window openings, said forked crevice fixed pin base further including a pair of pin members inserted through said aligned housing pin holes and said screen connector pin holes, said forked crevice fixed pin base having a pair of key block members for insert into said locating openings.

3. The portable computer system as recited in claim 1 wherein said keyboard incorporates a mini-screen system for indicating the operating mode of said computer system, said computer system including a plurality of expansion contact ends for electrically interfacing with said floppy disk drives, a printer, a modem, a video screen and expansion circuit boards for increasing the versatility of said portable computer system.

4. The portable computer system as recited in claim 1 wherein said computer system includes a built-in chamber for insertion thereof of RAM for expanding memory capacity of said computer system.

* * * * *